United States Patent
Koch et al.

[11] 3,916,206
[45] Oct. 28, 1975

[54] AUTOMATIC FILM LOADER FOR X-RAY SPOT FILM DEVICE

[75] Inventors: Rockne E. Koch; Howard R. Wagner, both of Milwaukee, Wis.

[73] Assignee: General Electric Company, Schenectady, N.Y.

[22] Filed: Feb. 27, 1974

[21] Appl. No.: 446,158

[52] U.S. Cl................................ 250/468; 250/471
[51] Int. Cl.².......................................... G11B 1/00
[58] Field of Search.................... 250/468, 469, 471

[56] References Cited
UNITED STATES PATENTS

| | | | |
|---|---|---|---|
| 3,415,988 | 12/1968 | Gidlund | 250/468 |
| 3,553,453 | 1/1971 | Hogan | 250/471 |
| 3,628,840 | 12/1971 | Wenthe et al. | 250/468 |
| 3,775,613 | 11/1973 | Hommerin | 250/468 |
| 3,784,834 | 1/1974 | Berger | 250/469 |

*Primary Examiner*—James W. Lawrence
*Assistant Examiner*—D. C. Nelms
*Attorney, Agent, or Firm*—Ralph G. Hohenfeldt; Fred Wiviott

[57] ABSTRACT

A light tight tunnel extends over the top of a diagnostic x-ray table. A film cassette is mounted for reciprocating in the tunnel between an x-ray exposure position and a position in which the cassette is unloaded or loaded with film automatically. Unexposed films are dispensed one at a time into the cassette from a feed magazine at one end of the tunnel. After exposure, the film is ejected from the cassette into a receiving magazine at the same end of the tunnel.

43 Claims, 19 Drawing Figures

FIG. I

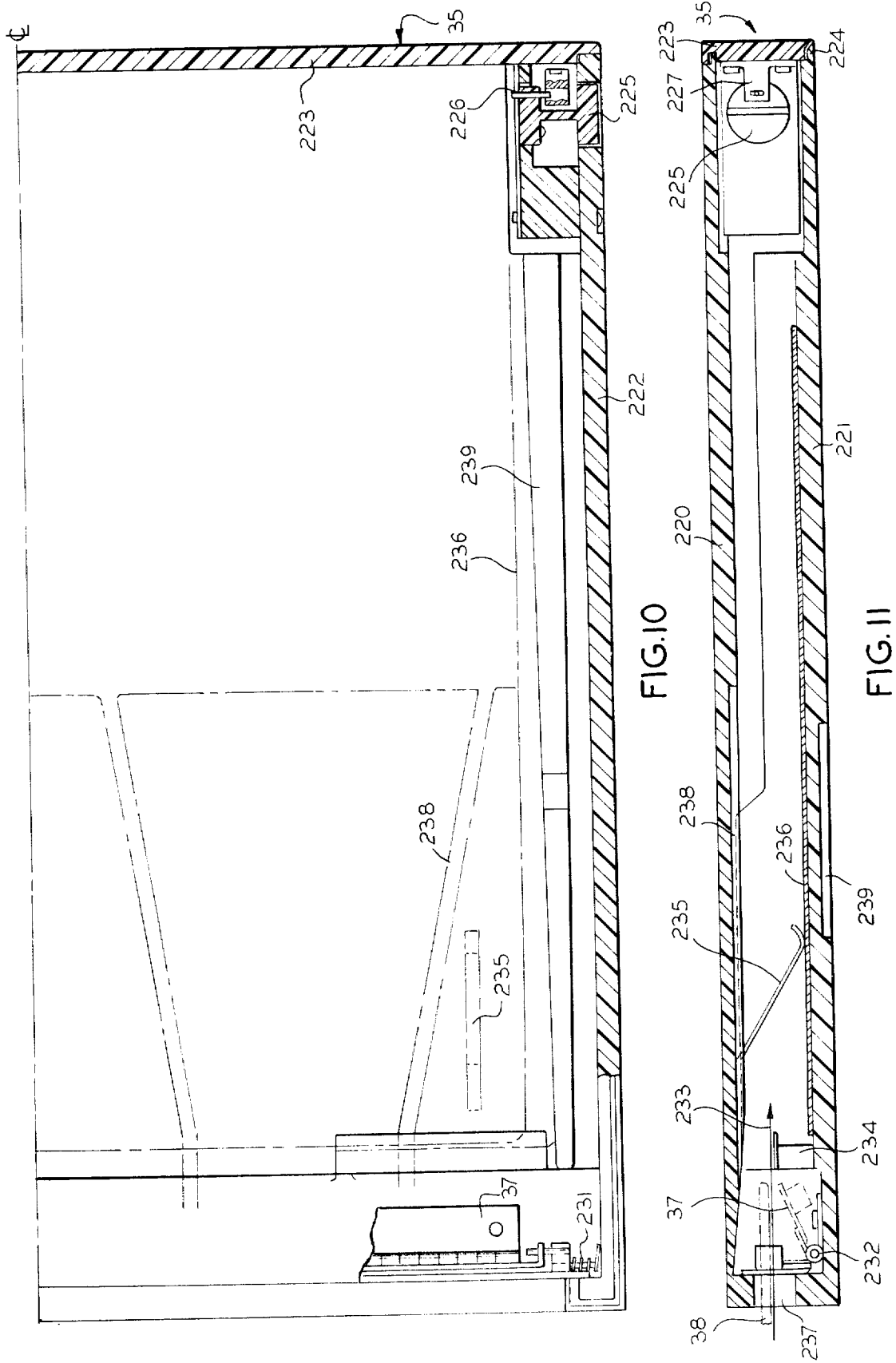

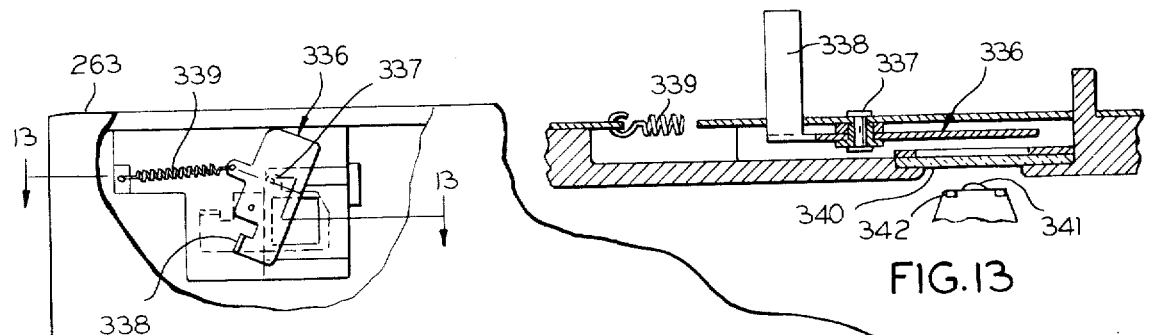
FIG.13
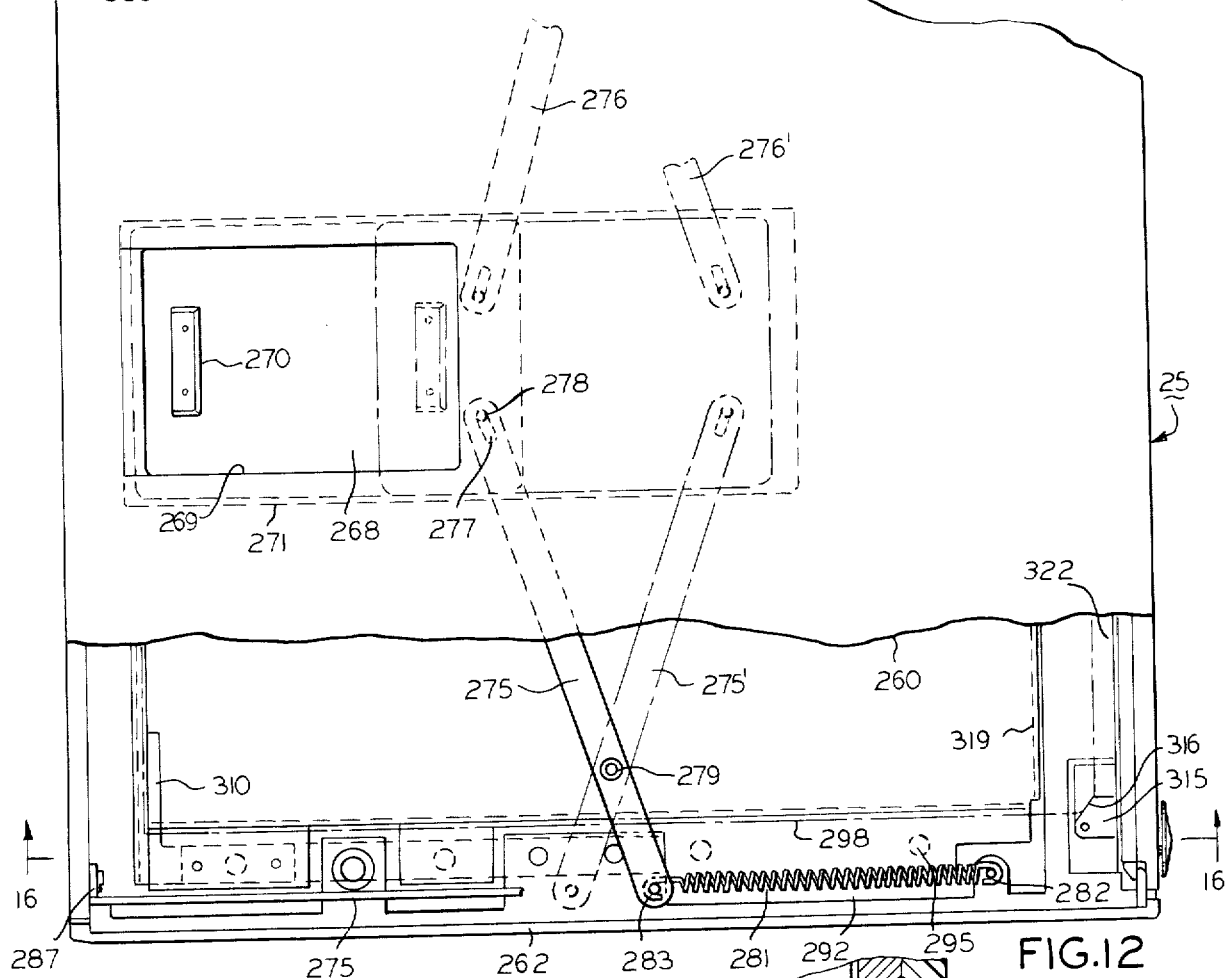
FIG.12
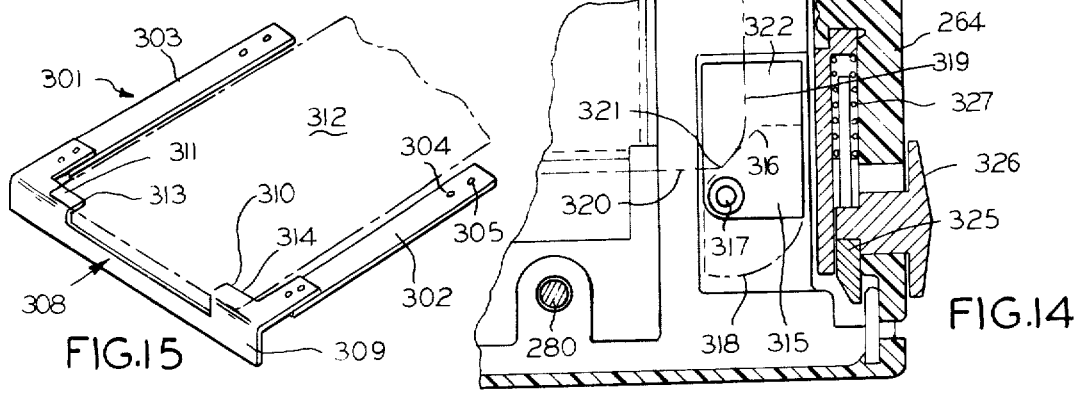
FIG.15
FIG.14

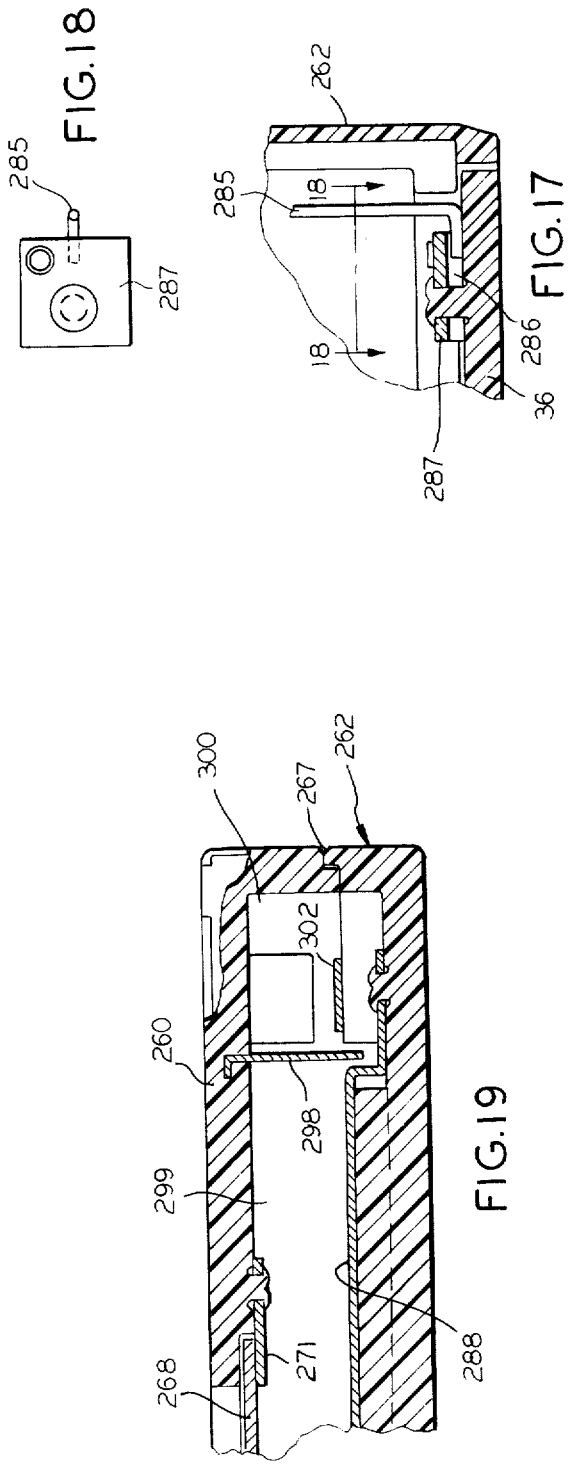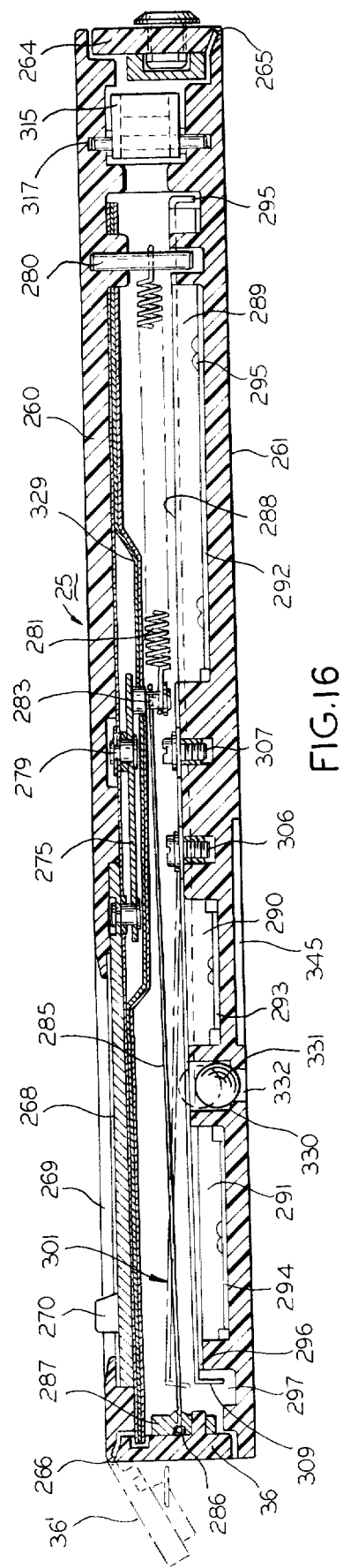

AUTOMATIC FILM LOADER FOR X-RAY SPOT FILM DEVICE

BACKGROUND OF THE DISCLOSURE

This invention relates to improvements in spot film devices for diagnostic x-ray apparatus.

Conventional spot film devices comprise a housing or tunnel that is mounted over an x-ray table for being moved longitudinally and laterally of the table top in planes that are parallel with the top. X-rays from a source in the table body pass through a subject situated on the table top and form an image of the subject's anatomy which may be visualized on a fluoroscopic screen at the top of the tunnel near its front end. An x-ray image converter may be substituted for the fluoroscopic screen in which case the x-ray image is converted to a bright visible image that may be viewed directly through either an optical system in proximity with the converter or a television camera and a remotely located monitor.

When the operator desires to make a permanent recording of an observed anatomical image, a cassette is projected into the x-ray beam path within the tunnel and an x-ray exposure is made. As is well known, spot film devices are provided with means to shift the cassette in a manner that permits making a number of radiographs on different areas of the film.

A disadvantage of conventional spot film devices is that they require manual loading of each cassette with a single sheet of film in a darkroom. The loaded cassettes are usually withdrawn one at a time from the darkroom and deposited in the movable carriage of the spot film device through a suitable recess within the tunnel. After an exposure sequence is completed, the cassette is manually removed from the tunnel and returned to the darkroom for unloading and development of the film. As a practical matter, this requires that a technician must be standing by to insert and remove film cassettes from the spot film device during x-ray examination of a subject. Moreover, manual handling of the film cassettes causes delay of the radiographic procedures and sometimes a transient anatomical condition cannot be permanently recorded on film because the condition may disappear during the interval when the technician is removing the cassette and substituting another one.

Another disadvantage of using individual cassettes is that a fairly large number of them must be kept on hand and loaded with film in readiness for use with consecutive examination subjects. The loaded and unloaded cassettes are, of course, much thicker and heavier than the individual films so the cassettes occupy much valuable storage space.

SUMMARY OF THE INVENTION

A general object of this invention is to overcome the above mentioned and other disadvantages of conventional spot film devices by providing a device which has means for automatically loading and unloading a film cassette while it remains in the spot film device.

A further object of this invention is to provide a spot film device which employs automatic means for withdrawing film from a supply magazine and for returning exposed film to a receiving magazine wherein the magazines are capable of storing a large number of films in the x-ray apparatus itself.

Another object of this invention is to provide a spot film device which holds a large number of films in a state of readiness for exposure and which permits withdrawal of an exposed film receiving magazine for development of one or more films at any time at the option of the operator.

Yet another object of this invention is to provide a novel means for ejecting exposed film from a cassette into a film receiving magazine.

A further object is to provide a film supply magazine which restricts withdrawal of film to one film at a time.

Another object is to provide a film supply magazine which is equipped with means for indicating when the supply of film is depleted.

Other objects are to provide means for withdrawing film from a supply magazine which means are characterized by the absence of known problems in prior art film feeding devices such as permanent film deformation and scratching and creation of artifacts on the film due to exposure by electrostatic charge.

A more general object is to provide an automatic loading and unloading spot film device which is compact, easy to use and improves the productivity of diagnostic x-ray apparatus.

In general terms, the new spot film device is characterized by a housing and a tunnel extending therefrom in substantial parallelism with and laterally of the top of a diagnostic x-ray table. An x-ray tube is located within the body of the table and it directs a beam of x-rays through an examination subject supported on the table top between the tube and the tunnel. The front end region of the tunnel is sufficiently permeable to an x-ray image transmitted through its bottom to form a suitable image on a fluoroscopic screen or on an electronic x-ray image-to-light image converter which is located above the tunnel for the purpose of examining the subject fluoroscopically in a well known manner.

In accordance with the invention, within the tunnel there is a film cassette carriage which is retracted rearwardly from the x-ray beam during fluoroscopy and is advanced forwardly into the beam when a spot film series is being made. The carriage supports a cassette which, in one embodiment, comprises a lower x-ray transmissive platen on which there is an x-ray intensifying screen that converts x-radiation to light and thereby enhances exposure of a film resting on the screen. A swinging cover with an x-ray intensifying screen on its bottom surface cooperates with the platen to compress the film during radiography. The carriage is supported on means for shifting it laterally and longitudinally to enable taking a sequence of exposures on different areas of the same film. When exposure is complete, the carriage is retracted and the cassette cover is automatically opened at an appropriate time and the film is ejected into an exposed film receiving magazine located in the housing associated with the tunnel. Means are provided for dispensing an unexposed film from a film feed magazine to between the intensifier screens of the cassette and it is then in readiness for another exposure sequence.

The feed magazine stores several sheets of film and is uniquely constructed to limit discharge of films one at a time. It has means for optically sensing when the last sheet of film is emptied from the feed magazine and there are means for indicating to the operator when the magazine is devoid of film.

Optical means are also used to sense and indicate the lateral and longitudinal position of the cassette. The optical means control logic devices which center the film cassette when the last exposure is made so the cassette can be retracted to parked or unload and load position.

How the foregoing and other more specific objects of the invention are achieved will be evident in the more detailed description of a preferred embodiment of the invention which will be set shortly hereinafter in reference to the drawings.

DESCRIPTION OF THE DRAWINGS

FIG. 10 is a plan view of one symmetrical half of a magazine used for receiving exposed film in the spot film device, the enclosure housing being shown partly in section, and some parts being broken away to show the interior;

FIG. 11 is a longitudinal vertical section taken through the film receiving magazine;

FIG. 12 is a plan view, with parts broken away of the new film supply and feed magazine used in the new spot film device;

FIG. 13 is a fragmentary section view of the indicator of the presence or absence of film in the feed magazine, said section being taken on the line 13-13 in FIG. 12;

FIG. 14 is a plan, enlarged, fragmentary and partially sectional view of the right forefront corner of the magazine shown in FIG. 12, this being a rear corner of the magazine;

FIG. 15 is an isolated perspective view of a film retainer used in the film feed magazine;

FIG. 16 is a longitudinal vertical section of the feed magazine taken substantially on the line 16—16 in FIG. 12;

FIG. 17 is a horizontal section of a fragment or front corner of the feed magazine, showing some details of the film discharge door and its operating mechanism;

FIG. 18 is a view of parts affiliated with the front door viewed in the direction of the arrows 18—18 in FIG. 17; and FIG. 19 is a fragmentary vertical section of the feed cassette looking into it from the front to the rear.

DESCRIPTION OF A PREFERRED EMBODIMENT

Figure 1:
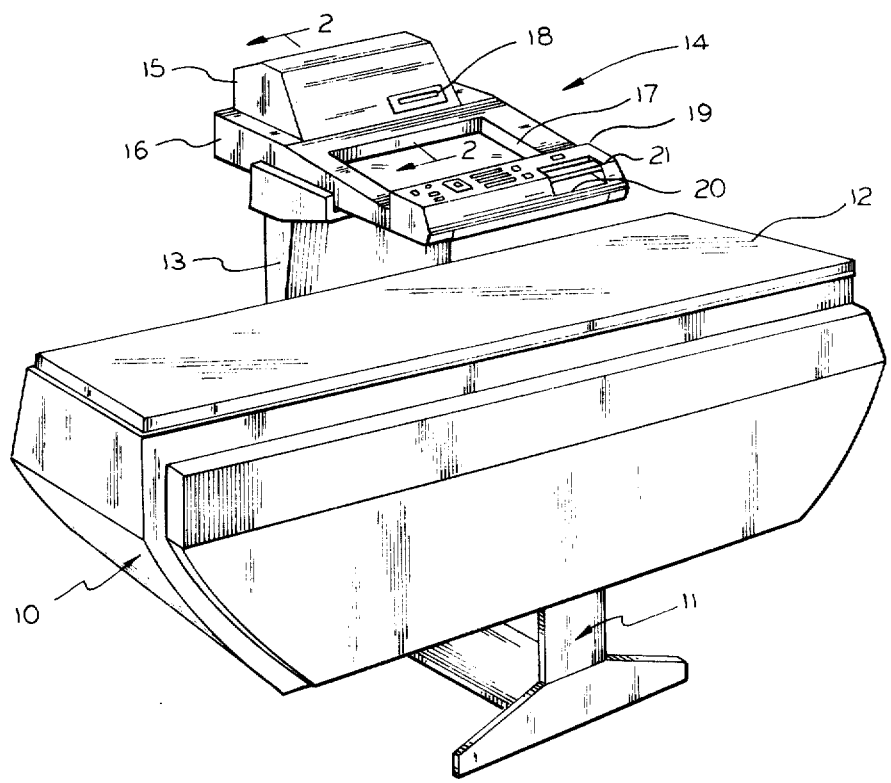
FIG. 1 is a perspective view of a typical diagnostic x-ray table in which the new automatically loading and unloading spot film device is employed.

A diagnostic x-ray table with which the new automatic loading and unloading spot film device is used is shown in FIG. 1. The table comprises a metal body 10 which is occupied by a mechanism that is typical of x-ray tables equipped for making spot films as those skilled in the art will understand. A stand 11 supports the table body on the floor and the body is understood to be tiltable about a laterally extending axis through opposite rotational angles so that the examination subject may be positioned anywhere between upright and inverted.

Although it is not visible, it will be understood that in table body 10 there is an x-ray tube which projects a beam through the x-ray transmissive subject supporting table top 12. The x-ray tube is supported on a carriage, not shown, which is adapted for moving bidirectionally longitudinally of the table body 10 interiorly thereof. A vertical column 13 is associated with the carriage and it supports the spot film device which is generally designated by the reference numeral 14. Device 14 comprises a housing including an upstanding portion 15 and a tunnel portion 16 which extends laterally over table top 12. The tunnel has an opening 17 or window in which or over which a fluoroscopic device, not shown, such as an x-ray luminescent screen or an electronic x-ray image converter may be located for conducting fluoroscopy.

In FIG. 1, housing portion 15 is provided with a slot 18 in which a card bearing a patient identification number may be inserted to transfer the patient number and other pertinent patient identification to radiographic film after it has advanced from a film feed magazine to the film cassette. The front end of the housing 14 is provided with a control box 19 on which various control push buttons and indicators are located. In a recess 20 there is a bar-like handle 21 by which the operator may manipulate the spot film tunnel such as to push it rearwardly on column 13 to provide clearance for the subject getting on and off the table top.

Figure 2:
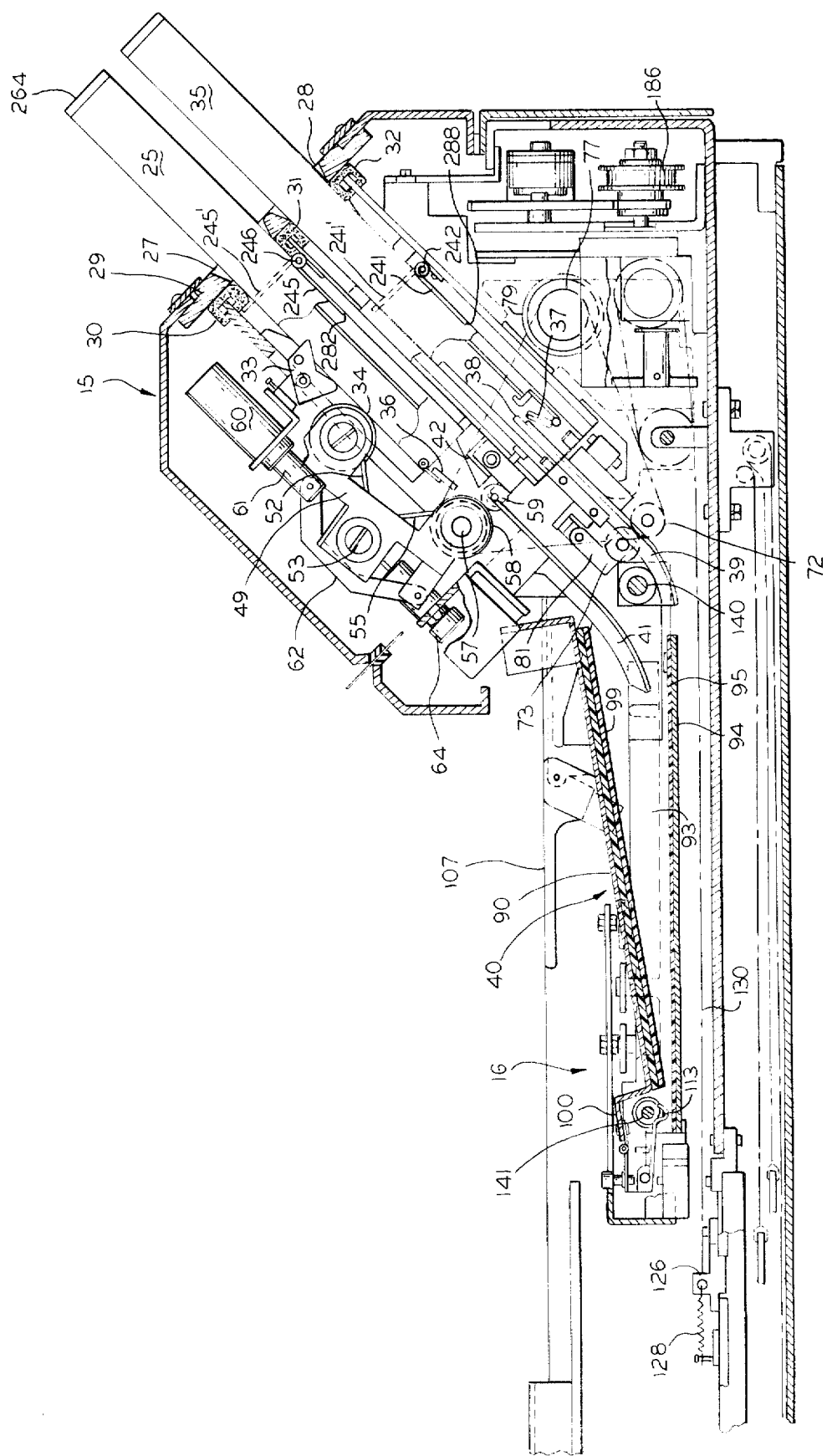
FIG. 2 is a partial vertical section of the film handling mechanism and cassette taken generally along the line 2—2 in FIG. 1.

The construction and operating mode of the new automatic loading and unloading spot film device will now be described in greater detail in reference to FIGS. 2-11. FIG. 2 shows a side view of the spot film device with the housing portion 15 and part of the tunnel 16 in section to expose their contents. Extending through the rear of housing portion 15 at an angle with respect to horizontal is a box-like film supply or feed magazine 25 and an exposed film receiving magazine 35. The magazines will be described in detail later. Supply magazine 25 accommodates a stack of about twenty-five unexposed films in one model thereof. Receiving magazine 35 can accept about fifteen exposed films. The feed and receiving magazines 25 and 35 may be inserted into housing 15 through slots such as 27 and 28 which are in a plate 29 at the rear of the housing. Slots 27 and 28 are surrounded by pliable seals 30–32 for excluding ambient light from the housing to thereby avoid inadvertent exposure of film. As will be discussed later when film supply or feed magazine 25 is described in detail, it is provided at its top with a sliding door, not shown in FIG. 2, that is engaged by a spring biased dog 33 which causes the door to slide open when magazine 25 is inserted to thereby provide access for a power driven film feed friction roller 34 which can be actuated to bear frictionally on the film stack in magazine 25 for propelling a single film therefrom on command. Feed magazine 25 also has an upwardly swinging door 36 in its front end to permit exit of the unexposed film. It will be evident later that actuating the top sliding door of supply magazine 25 will also cause swinging door 36 to open and permit film exit.

Exposed film receiving magazine 35 also consists of a box-like structure which has a swinging door 37 in its lower or front end as viewed in FIGS. 2 and 3 to permit ingress of exposed film from the movable cassette which will be described later. When receiving magazine 35 is being inserted into housing 15, door 37 is struck by a finger 38 which causes the door to open at about a 45° angle to provide a ramp for guiding exposed film into the magazine. Finger 38 extends from the rearwardly inclined end of an exposed film guide 39 whose lower end is curved to deflect film in the appropriate direction of the receiving magazine 35 when such film is ejected from the movable cassette assembly which is generally designated by the numeral 40 in FIG. 2. A partially curved and partially straight unexposed film guide 41 is associated with feed magazine 25 for directing film into movable cassette assembly 40 under the influence of a power driven friction roller 58 cooperating with an idler roller 59 as will be described. The film is guided to the rollers by a ramp 42 which is situated just outside of supply magazine door 36. The details of the mechanism for dispensing film from supply magazine 25 and for restoring exposed film to receiving magazine 35 will now be described primarily in reference to FIGS. 2 and 3 the latter of which shows some of the parts of the mechanism isolated from FIG. 2 for the sake of clarity.

Figure 3:
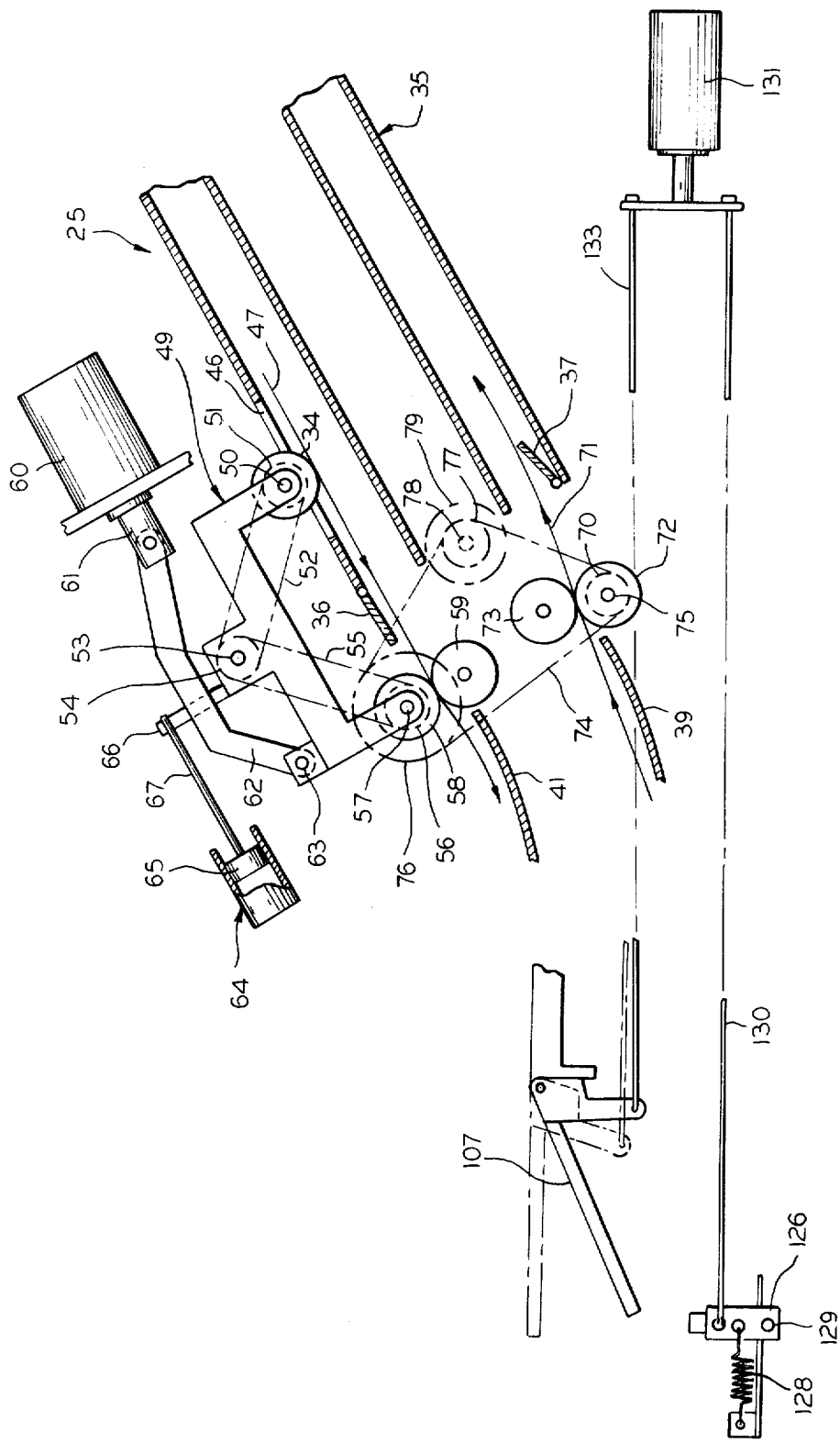
FIG. 3 is an enlarged isolated view of parts of the mechanism shown in FIG. 2.

In FIG. 3 supply magazine 25, which will be called feed magazine 15 hereafter for the sake of brevity is shown schematically. It has a top opening 46 and a cooperating light tight sliding door which is not shown in this view but may be seen in FIGS. 12 and 16. Assuming that the door is open, one may see that the topmost film 47 in a stack of films within magazine 25 may be frictionally engaged by a belt driven friction roller 34 which is journaled for rotation on a rocking frame 49. The roller 34 is on a shaft 50 on which there is also a pulley 51 which is driven by a belt 52. It is important that there be no static electricity conducted between friction roller 34 and film 47. If there is an electrostatic discharge, artifacts or blemishes will occur on the film due to electrochemical action. A variety of synthetic sponge materials were tried and found to produce a discharge. Applicants discovered that using an unfaced closed cell neoprene foam rubber material for roller 34 obviated this problem and was a major contributor to the successful development of the spot film device. A diprene rubber is also usable. Either rubber will obviate artifacts. The unfaced foamed type is preferred because it results in a higher coefficient of friction between the film feed roller 34 and film 47.

Rocking support or frame 49 has a shaft 53 journaled therein. The shaft has an elongated pulley 54 which has two grooves for accommodating a pair of belts 52 and 55. Rocking frame 49 is pivotally supported on a power driven shaft 57 in front which is a drive shaft for the film dispensing and pick-up system. Shaft 57 extends laterally across the assembly shown in FIG. 2 and has its ends journaled in a side frame casting 80 which can be seen in FIG. 9 where it is also evident that shaft 57 has a pulley 76 which is belt driven from a pulley on the shaft of motor 79. Also in FIG. 9 it is evident that motor pulley 77 uses a belt to drive another cross shaft 75 which, it will be evident from FIG. 3, has a friction roller 72 on it. There is also another pulley 70 on shaft 75 that is driven by belt 74 which is the same belt that drives pulley 76 and its associated driven shaft 57 and film feed friction roller 58 too.

The driven frictional film pick-up roller 72 adjacent the film receiving magazine 35 cooperates with an idler roller 73 which is carried on a spring biased pivot arm 81, see FIGS. 2 and 3. A film designated by the arrowheaded line 71 in FIG. 3 is picked up by cooperating rollers 72 and 73 after the exposed film is ejected from the cassette. The rollers then propel the film into receiving magazine 35.

As indicated, rocking member 49 in FIG. 3 is pivotable on drive shaft 57. When it is desired to dispense a film 47 from feed magazine 25, a solenoid 60 is energized to cause member 49 to rock down, or clockwise as shown, and place roller 34 in contact with film 47. The solenoid has a plunger 61 which engages member 49 by means of a link 62 that is pivotally connected to member 49 at 63. Member 49 rocks on the axis of shaft 57. Film feed initiating roller 34 is prevented from impacting film 47 too severely by the use of a dash pot 64 which has its plunger connected by means of a cable 67 to a pin 66 which extends from rocking member 49.

Dispensing of a film sheet from feed magazine 25 to movable cassette assembly 40 involves not only the dispensing mechanism but the construction and function of feed magazine 25 itself. The feed magazine is shown and will be described in detail later. The general characteristics of film dispensing will now, however, be discussed briefly.

When dispensing an unexposed film from feed magazine 25 to cassette assembly 40 is desired, the operator commands energization of film feed motor 79 at which time frictional feed initiating roller 34 begins to rotate counterclockwise as viewed in FIG. 3. Simultaneously, solenoid 60 is energized and rocking member rocks clockwise as shown in FIG. 3 to place feed roller 34 in contact with film 47. This causes the top film in the stack to slide rearwardly or away from the magazine film exit door 36. Moving the film slightly backwardly in the feed magazine 25 has to do with the manner in which the magazine is constructed to assure that only one film will be dispensed at a time. This will be understood when the magazine is described in detail.

After the film is urged rearwardly in the magazine and conditioned for dispensing in this embodiment, motor 79 reverses automatically and roller 34 rotates clockwise as viewed in FIG. 3. This causes the film to be advanced between driven roller 58 and idler roller 59 which cooperate to project the film into cassette assembly 40 which is omitted from the diagrammatic view in FIG. 3 but is shown in film loading position in FIG. 2.

When the cassette 40 assembly is loaded with film it may be advanced forwardly in the spot film tunnel for the purpose of making a radiograph, if desired. When the film is exposed according to a selected program, cassette assembly 40 is automatically returned rearwardly to its parked or film unloading position. By means which will be described, the exposed film is then ejected with a snap action at which time it is engaged between pick-up rollers 72 and 73 and delivered to receiving magazine 35.

Note that only a single motor 79 is required for both dispensing and returning film. This is so because these two operations are carried on at different times and in sequence. When rollers 58 and 59 are dispensing a film, of course, the previous film will already have been returned to receiving magazine 35 by means of roller 72 and 73. Moreover, roller 34 which initiates unexposed film feed to movable cassette 40 can continue to rotate while rollers 58 and 59 are advancing the film further because roller 34 is retracted from contacting the film by de-energization of solenoid 60 which swings rocking frame 49 counterclockwise while rollers 58 and 59 are active. In other words, when motor 79 and rollers 58, 59 are advancing the film, feed roller 34 is released from film contact. Thus, all functions of the film feed device depicted in FIG. 3 can be carried on sequentially with a single motor drive.

The movable cassette assembly 40 in which radiographs are taken will now be described. The cassette assembly is characterized by it being movable in tunnel 16 of FIG. 1 between a parked or a film loading and unloading position in which it appears in FIGS. 2 and 4 and a radiographic active position in which it appears in FIG. 5 where the x-ray beam may impinge on it from below. When the cassette assembly 40 has been moved back to the film dispensing and receiving mechanism described above as appears in FIG. 2, for the purpose of ejecting an exposed film, the cover 90 of the cassette assembly will be open and inclined upwardly. If the cassette assembly is selectively moved back as in FIG. 2 to park it and not to receive or eject film, cover assembly 90 of the cassette may be closed down to a horizontal position rather than the open and inclined position depicted in FIG. 2.

Figure 4:
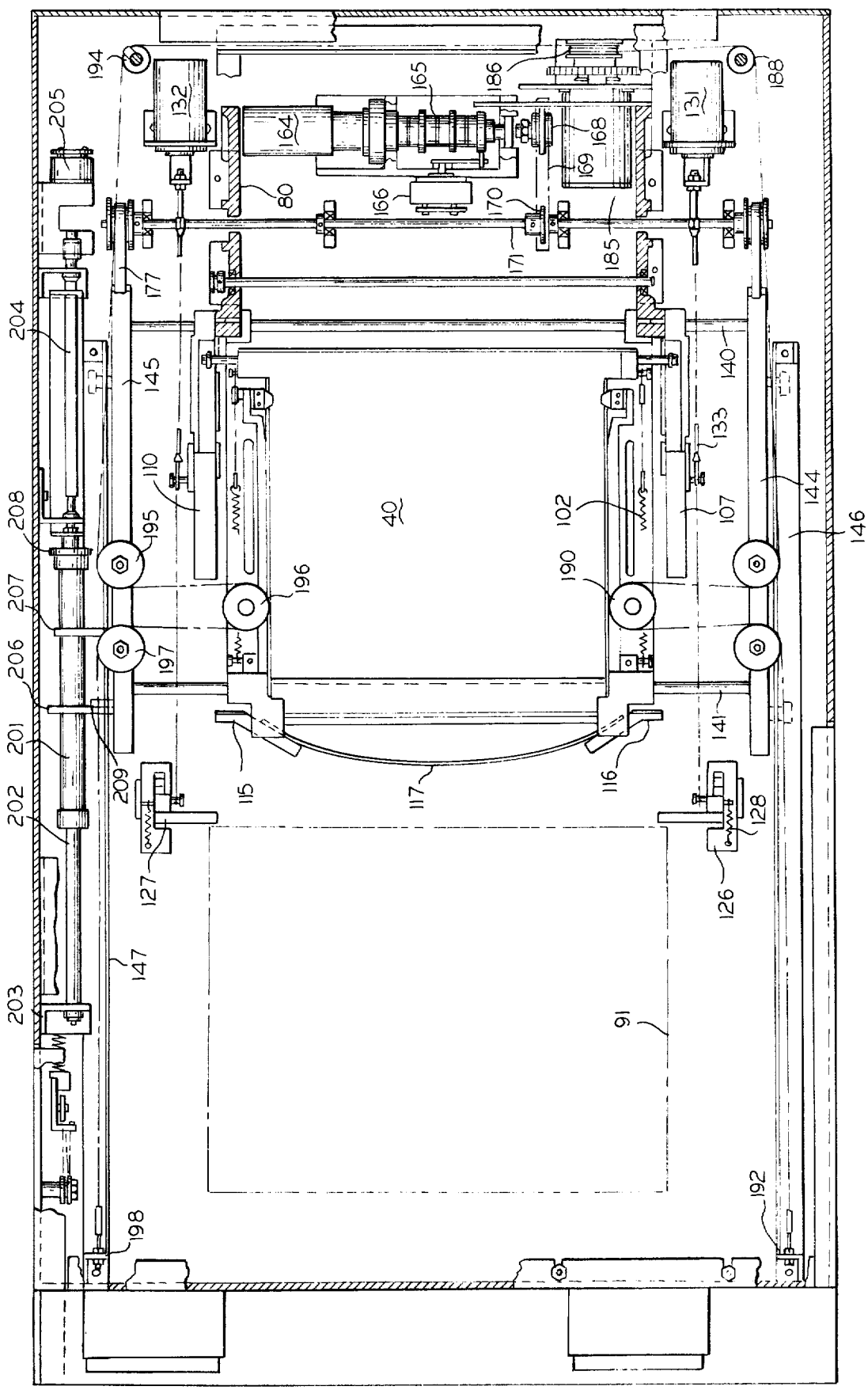
FIG. 4 is a plan view of the spot film device with the housing and some parts removed and with parts in section.
Figure 5:
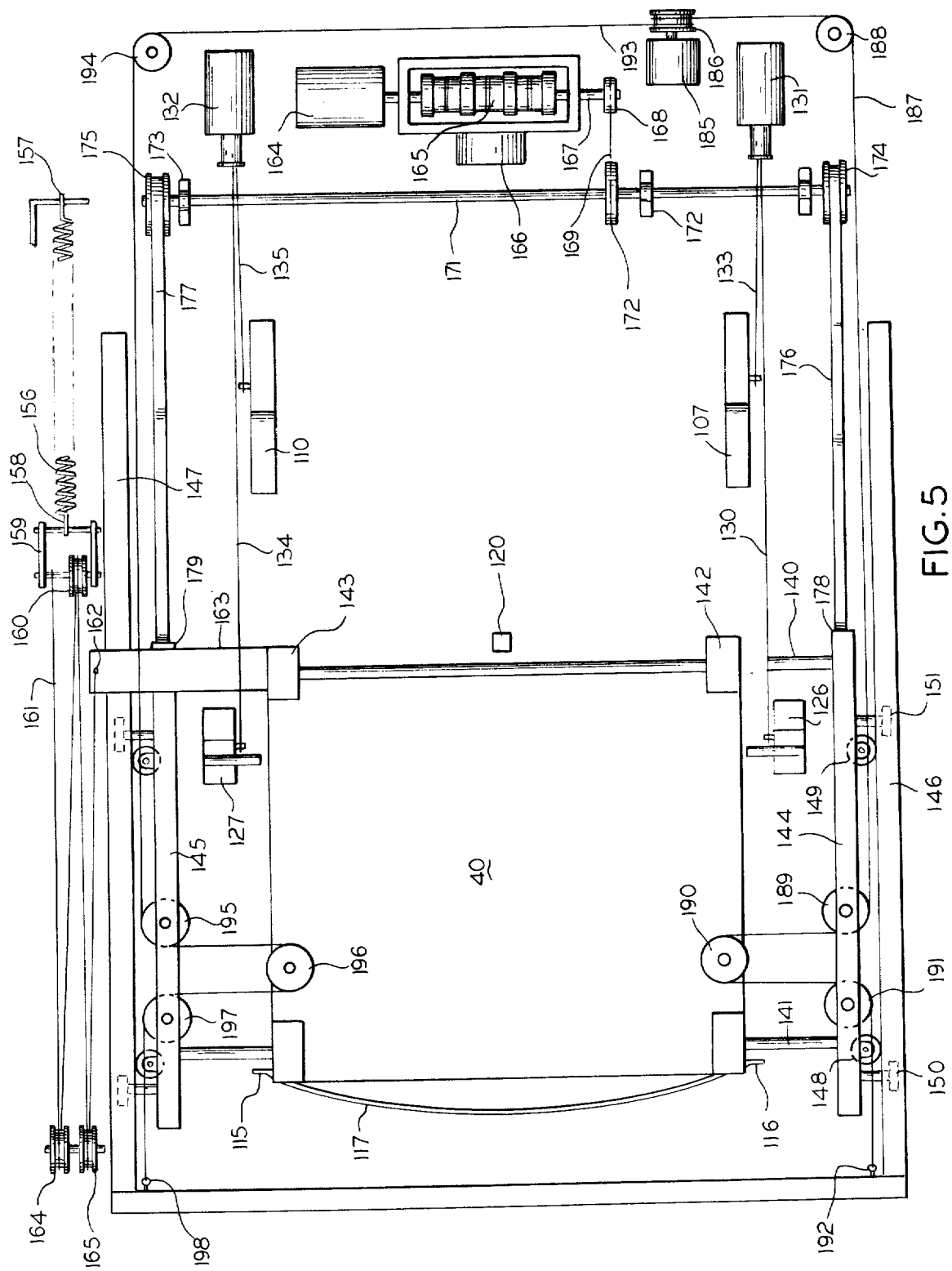
FIG. 5 is similar to the preceding figure except that some parts have been removed to reveal other parts.

The cassette assembly 40 is adapted to move from its rearward parked or film loading and unloading position as in FIG. 4 to the forward radiographic active position as in FIG. 5. When in active position it will be within the boundaries of a rectangle which is defined by the dashed line 91 in FIG. 4. At this time an x-ray image penetrating through the bottom of tunnel 16 may be recorded on a film in cassette assembly 40. The cassette assembly is adapted for being shifted laterally and longitudinally at the exposure position to permit exposure of halves or quarters of the film sheet in the cassette.

Figure 6:
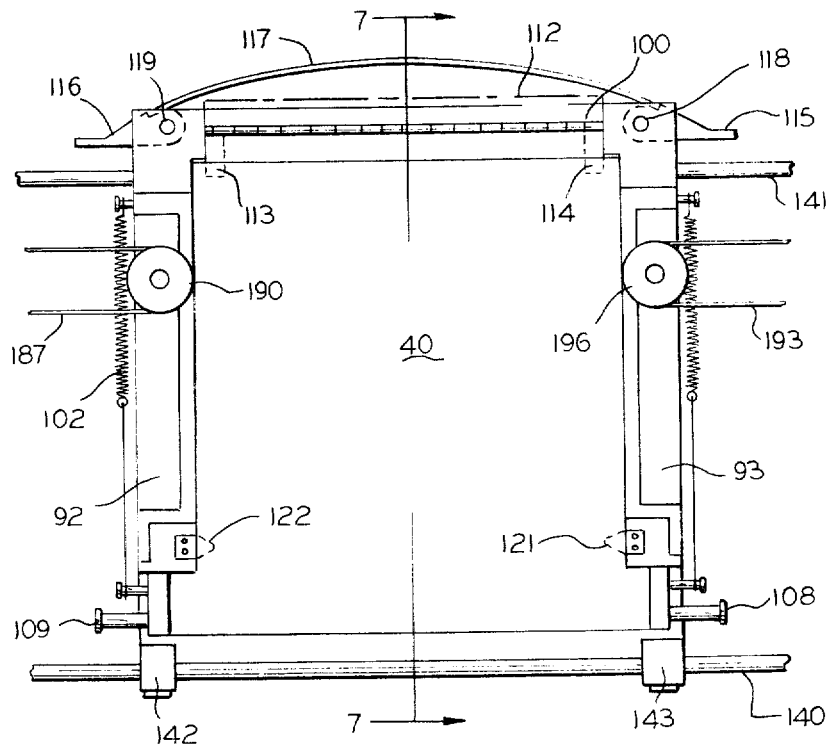
FIG. 6 is an isolated plan view of the movable cassette.
Figure 7:
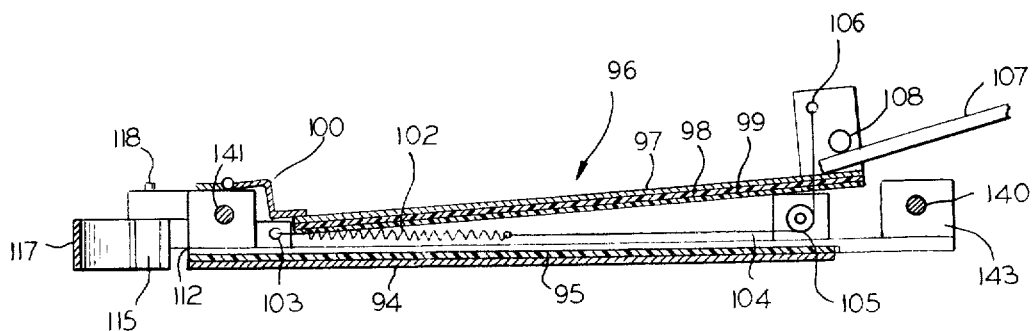
FIG. 7 is a vertical section taken along the line 7—7 in FIG. 6.

An isolated plan view of the cassette assembly 40 appears in FIG. 6 and a vertical section through it is shown in FIG. 7. The assembly comprises rigid side members 92 and 93 to the bottom faces of which is fastened a plate 94 of x-ray transmissive metal such as aluminum which spans between the side members. Held to the top of plate 94 is an x-ray intensifying screen 95 on which the film rests during exposure. The cassette has a cover 96 which comprises a light metal plate 97 to which is adhered a layer of resilient polyurethane foam 98 on the bottom of which another intensifying screen 99 is adhered as can be seen in FIG. 7 where the cassette cover is shown in its upwardly inclined open position. Cover 96 has a hinge 100 that is fastened to the rigid side members 92 and 93. Cover 96 is normally biased toward closed position or in contact relation with lower intensifying screen 95 by means of a spring 102 which is anchored at 103 and has its other end joining a cable 104 that runs around a pulley 105 and attaches to a fixed point 106 which is mounted to the cover 96. As shown in FIG. 7, when a pin 108 affiliated with cover 96 is engaged by a ramp 107 by virtue of the cassette being driven in a rearward direction against the ramp, the cover is swung open in opposition to the closing force of spring 102. As will be explained later, there are two ramps 107 and 110 which are caused to swing down and engage pin 108 and its counterpart 109, respectively, when it is desired to open cover 96 for ejection of film from the movable cassette to the receiving magazine 35. The pair of ramps 107 and 110 may also be restrained selectively in a horizontal position in which case the cassette assembly 40 can pass under them without the cassette cover 96 opening as would be the case when it is merely desired to return the cassette assembly to parked position adjacent the film feed mechanism without loading or unloading a film therefrom.

When a sheet of unexposed film is projected between cover 96 and the platen of the cassette comprised of intensifying screen 95 and plate 94, the leading edge of the film which is shown as a phantom line and marked 112 in FIG. 6 extends from the cassette about one-fourth inch in one model. A frictional braking force or drag is imposed on the film as it enters the cassette by a pair of flat spring members 113 and 114 which have curved pressure ends as can be seen in the profile view of spring 113 in FIG. 2. Pivotally mounted on the leading or forward end of cassette assembly 40 are a pair of lugs 115 and 116 in which the opposite ends of a curved or bowed flat spring 117 are fastened. The lugs are pivotal on pins 118 and 119. As will be described, lugs 115 and 116 strike a pair of cooperating pivotable posts 126 and 127 when the cassette has moved to a predetermined position toward the rearwardly film unloading position. Striking the posts 126 and 127 toggles flat spring 117 over center or arcuately oppositely to the position it has in FIGS. 5 and 6 causing drag imposing spring members 113 to rise, thus releasing the film and subsequently causing the flat spring 117 to strike the leading edge 112 of the film, which extends from under the cassette cover, and eject it to the film pick-up rollers 72 and 73 adjacent exposed film receiving cassette 35. Of course, at this time the cassette 40 cover 90 will have encountered ramps 107 and 110 for opening the cassette cover to permit film ejection. When flat spring 117 reaches an upstanding stationary pin 120 in the bed plate of the tunnel, see FIG. 5, the spring 117 is toggled back over center to its original position as it appears in both FIGS. 5 and 6. Extending from the platen of cassette 40 in an inwardly fashion as can be seen in FIG. 6 are a pair of pointed tabs 121 and 122. The side edges of the film extend under these tabs and the tabs prevent the film from being picked up cohesion of the cover when it is opened.

Swingable posts 126 and 127 for engaging sidewise extending arms or lugs 115 and 116 to load over center film ejecting spring 117 selectively may be seen in FIGS. 2-5. The ramps 107 and 110 for engaging the cassette cover opening pins 108 and 109 may also be seen in these figures. Considering FIGS. 3 and 5, one may see that there are two pivotable posts 126 and 127 mounted on the bottom of the tunnel. As seen in FIG. 3 where one of the posts 126 is shown, a spring 128 tends to bias post 126 to a normal horizontal position about its pivot point 129. However, when it is desired to toggle flat film ejector spring 117 over center by engaging arms 116 and 115, post 126 is driven to an upright position in FIG. 3 by means of a cable 130 that connects the post to a solenoid 131. The post 126 stands upright when the solenoid 131 is energized. A solenoid 132 operates the other post 127. When the posts are lying horizontal, spring loading arms or lugs 115 and 116 pass over them in transit to the parking position of the cassette and flat spring 117 is not activated to eject the film. Solenoids 131 and 132 also operate pivotable ramps 107 and 110. When posts 126 are up, ramps 107 and 110 are inclined downwardly as illustrated in FIGS. 3 and 7 in which case the ramps engage pins 109 and 108 associated with the cassette cover 90 to open the latter. Thus, the cassette cover opens at any time that the film ejection spring 117 is activated. When the cassette assembly 40 is simply being transferred from forward radiographic position to rearward parked position, cover opening pins 108 and 109 merely pass under the unpivoted ramps 107 and 110. Solenoids 131 and 132 are programmed to activate the ramps and spring loading posts at any time that the operator presses the proper button on the control panel 19 at the front end of the tunnel for effectuating film ejection only after a film is completely exposed. The logic system, not shown, is such that when the ejection switch button is pressed the cassette carriage will automatically return toward film unloading position and solenoid 131 and 132 will be energized automatically to operate the ramps and the posts.

The manner in which the cassette assembly 40 is transported between forward active radiographic position and parked or film loading or unloading position and the manner in which the cassette is shifted bidirectionally to take a series of radiographs on the same film when in active radiographic position will now be described. In FIGS. 4–6 one may see that the cassette assembly 40 is carried on a pair of crosswise rods 140 and 141. There are linear bearings in side member extensions 142 and 143 for the cassette to slide laterally in opposite directions on rod 140. There are also linear bearings, not depicted, in FIG. 6 for the cassette assembly to slide on parallel rods 141. As can be seen particularly well in FIGS. 4 and 5, the respective opposite ends of rods 140 and 141 are fastened to a pair of carriage side bars 144 and 145 which extend parallel with the line of motion of the cassette carriage. A pair of tracks 146 and 147 are mounted in the tunnel for guiding the carriage therein. The construction is symmetrical. Consider side bar 144 in the forefront of FIG. 5. It has a pair of vertical axis rollers 148 and 149 mounted on it. These rollers bear on the inside of track 146. There are also a pair of horizontal axis rollers 150 and 151 which cooperate with another surface of the rail 146. There are similar rollers associated with side bar 145 which cooperate with rail 147 to constrain the carriage or cassette assembly 40 to move as an entity lengthwise of the tunnel.

As may be seen in the upper region of FIG. 5, the cassette carriage is projected forward to radiographic active position with a coil spring 156. The coil spring is anchored at 157 to the bottom of the spot film tunnel and the other end 158 thereof attaches to a trolley 159. The trolley has a pulley 160. A cable 161 has one of its ends attached to trolley 159 and another of its ends attached at 162 to a side arm 163 extending from the cassette carriage. Cable 161 runs over a pair of idler pulleys 164 and 165 to change the force direction of spring 156 so that when it contracts the cassette carriage 40 will be urged to the radiographic position as in FIG. 5 at which time spring 156 is substantially unloaded. Spring 156 is stretched and loaded when cassette carriage 40 is in parked position as in FIG. 4.

The cassette carriage 40 is restored to parked position and spring 156 is loaded by a motor 164 near the rear end of the tunnel, see FIG. 5. The motor drives through a clutch assembly 165. A rotary solenoid 166 is energized to release the clutch 165 and to disengage motor 164 from the output shaft 167 of the clutch. The output shaft 162 has a sprocket 168 on it. The sprocket has a chain 169 running on it which engages another sprocket 170 on a cross shaft 171 which is journaled in four bearing posts 172 and 173 of which two are shown. The ends of shaft 171 have drum pulleys 174 and 175 affixed thereon. Corresponding ends of a pair of belts or tapes 176 and 177 are fastened to the drum pulleys and a portion of the belts wraps around each of them. Another end of belt 176 attaches at 178 to side bar 144. An end of belt 177 attaches to side bar 145 at 179. When solenoid 168 is de-energized clutch 165 engages motor 154 with cross shaft 171, and if the motor 164 is energized, belts 176 and 177 will be wound on their drum pulleys 174 and 175 and cassette carriage 40 will be retracted to parked or film loading and unloading position. At the same time, cassette return coil spring 156 will be loaded and placed in readiness for transferring the cassette carriage 40 forwardly to radiographic active position at a high rate, preferably, compared to its retraction rate. When the operator operates the appropriate switch for energizing solenoid 166, clutch 165 is disengaged and the carriage 40 springs forward rapidly into radiographic position.

The cassette carriage may be shifted bidirectionally with a motor 185 to take a series of radiographs selectively on halves or quadrants of the film in cassette carriage 40 as can be seen in FIG. 5. The motor 185 has a cable drum 186 on its shaft. A cable 193 extends from the drum 186 in two directions. One portion 187 of the cable extends around an idler pulley 188 and then around a pulley 189 on side bar 144 from whence it goes around a pulley 190 on the cassette carriage and then to a pulley 191 on the side bar whereupon it terminates at a fixed attachment 192. The other cable length 193, extending from drum pulley 186, runs over an idler pulley 194 and a similar group of three pulleys 195, 196 and 197 whereupon the cable terminates in a fixed attachment at 198. One may see that if motor 185 turns in one direction, cassette carriage 40 may be shifted upwardly as it appears in FIG. 5 or longitudinally of the x-ray table top. If the motor runs in an opposite direction, the cassette carriage will shift to its limit in the opposite direction. In this manner the cassette carriage can be positioned so that the central ray of the x-ray beam will be at the center of the area on which a radiograph is to be taken.

When cassette carriage 40 is propelled forward by coil spring 165 to active radiographic position, it is desirable to stop the carriage in a position where the film exposure area is over the central x-ray beam at the outset. Suitable means for accomplishing this end are described in detail in U.S. Pat. No. 3,383,506 which is assigned to the assignee of this application. The sequencer and carriage decelerating means shown in that patent are incorporated substantially bodily into the new automatic loading and unloading spot film device herein described. As can be seen in FIG. 4, the device for selectively positioning the cassette carriage lengthwise of the tunnel comprises a dash-pot cylinder 201 which is slidable on a square shaft 202 that is rotatable in a bracket 203. The opposite end of dash-pot 201 is engaged by a shaft 204 that is driven by a stepping solenoid 205. Cylinder 201 has some cams 206, 207 and 208 extending from it. The cams 206-208 extend radially by different amounts and they each have clearance spaces of lesser radial extent. Stepping solenoid 205 is operated to set one of the cams 206–208 in the path of a lug 209 that extends from cassette carriage 40. Thus, when carriage 40 is propelled forward, lug 209 will engage a cam and transfer dash-pot cylinder 201 along rod 202 until the cylinder reaches the limit of bracket 203. This stops the cassette carriage in a forward and radiographic active position depending on which one of the cams has been turned into engagement relation with lug 209.

Film receiving magazine 35 will now be described in reference to FIGS. 10 and 11. The magazine is basically a molded resin box-like structure comprising a top 220, a bottom 221 and a side 222 for which there is a counterpart that is not shown in the half view in FIG. 10. The magazine has a rear door 223 for removing exposed film therefrom. The door may be separable or hinged to the magazine body. In this case a hinge 224 comprising a flexible resin web is molded integrally or as an extension of bottom 221 to door 223. An eccentric mechanism comprising a cylinder 225 having a pin 226 engagable with an element 227 extending from door 223 permits cranking the door closed and opened by use of the fingers to turn the cylinder 225. Any hinge and lock which maintains the door in light-tight relation with the magazine body may be used.

The film entry end of receiving magazine 35 has the internally swinging door 37 which was mentioned in connection with discussing FIG. 2 earlier. Door 37 is biased toward closed position with a torsion spring 231 as can be seen in FIG. 10. As explained earlier, door 37 is caused to open by a finger 38, see FIG. 2, when receiving magazine 35 is installed in the spot film device. The finger causes door 37 to tilt back at an angle of about 45° to serve as a ramp for guiding incoming film which travels substantially along the plane designated by the arrowheaded line 233 in FIG. 11. The incoming film glides over a ledge 234 immediately behind the door 237 and extends from the bottom 221 of the magazine 35. When exposed film is ejected from cassette assembly 40 into receiving magazine 35, the film passes under a flat spring tucker 235 which presses the film toward the bottom of the magazine. One sheet of film which is in storage position in receiving magazine 35 in FIG. 11 is identified by the reference numeral 236. Spring tucker 235 yields under the influence of incoming film 236 and allows the film to pass under it so that the film will be secured in the bottom of the cassette and clear of the path 233 along which film enters. The ledge 234 assures that the film will not slip from magazine 35 through film entry opening 237 with which door 37 cooperates. Some ribs 238, which are shown in phantom in FIG. 10, extend downwardly from the magazine top 220 internally of the magazine for further guiding and directing the film. There are also elongated side guides 239 for guiding the film in the cassette.

The film receiving magazine 35 may take a variety of forms. It is essentially a light-tight enclosure having a rear door such as 223 for removing exposed film and a front door such as 37 for permitting entry of exposed film and some means for holding the film in place so it does not slide out of the entry door when the magazine is at an inclination when installed in the spot film device.

Figure 8:
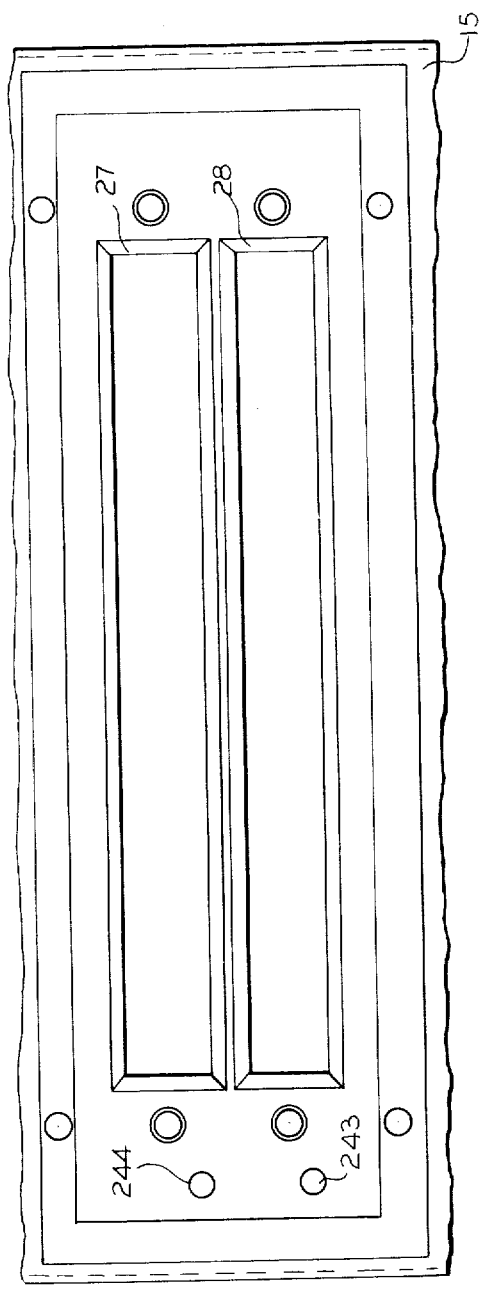
FIG. 8 is a fragmentary rear view of the housing showing the openings for the film feed and exposed film receiving magazines.
Figure 9:
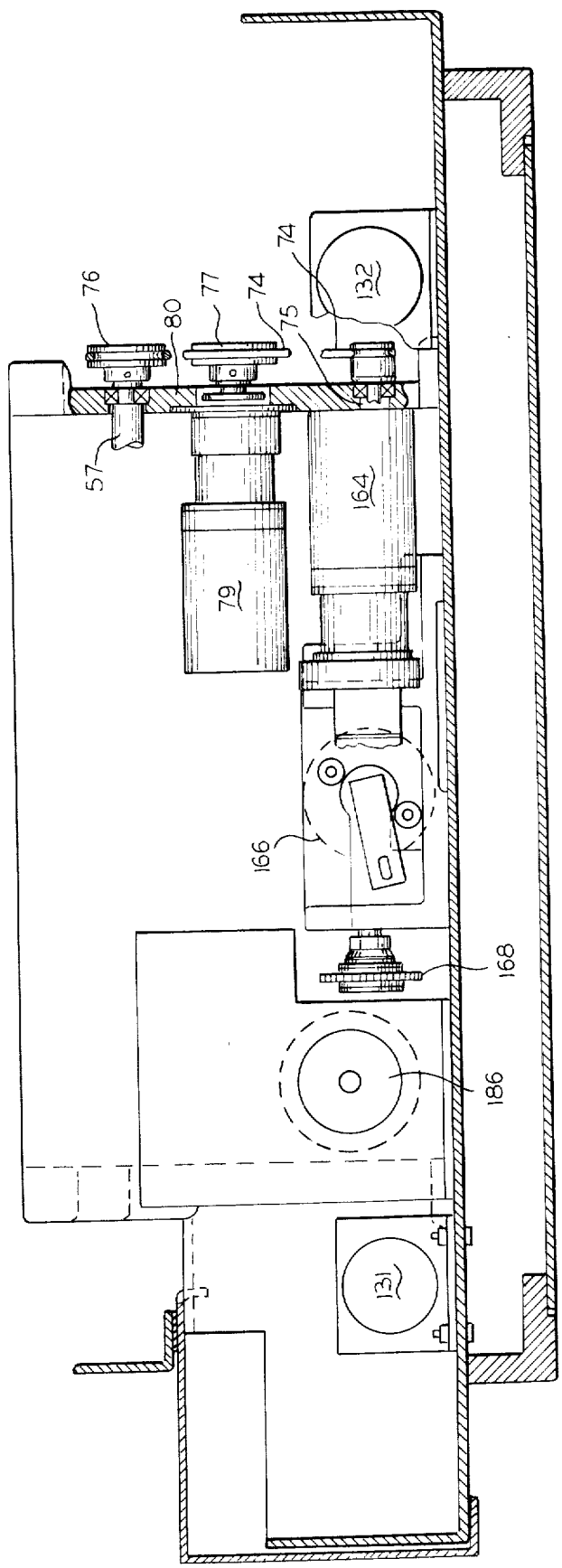
FIG. 9 is a rear view of the mechanism shown in FIG. 2 with parts omitted and with some parts in section.

Note that the bottom 221 of film receiving magazine 35 is provided near its front end with a recess 239 for securing the magazine in the spot film device. Referring to FIG. 2, one may see that when magazine 35 is installed, recess 239 is engaged by a spring biased latch plate 241 which is shown in solid lines wherein its forward edge is engaged with recess 239 to thereby preclude magazine 35 from being inadvertently withdrawn from the spot film device and to also assure that the magazine is fully inserted. Latch plate 241 is on a pivot pin 242 about which it is spring biased to normally assume an upright position in which it appears in dashed lines marked 241'. When receiving magazine 35 is inserted, latch plate 241 is bent down and a spring biased into engagement with recess 282. To withdraw the magazine 35, it is necessary to deflect the latch plate 241 counterclockwise as it appears in FIG. 2 so the plate clears the recess 239 and permits withdrawal. In an actual embodiment, hinge pin 242 carries a pinion, not shown, which is engagable by a translatable rack, not shown. The rack has a manually movable pin extending rearwardly of housing 15 and is spring biased to cause an operating or magazine release pin 243 to extend out of the rear of housing 15 as can be seen in FIG. 8. Depression of pin 243 releases latch plate 241 for removal of the receiving magazine 35. A similar pin 244 releases a latch plate of similar construction, marked 245 and 245' in FIG. 2, for the film feed magazine 25. The film feed magazine latch plate is on a pivot pin 246.

The unexposed film feed or supply magazine 25 will now be described in reference to FIGS. 12–19. In FIGS. 12 and 16 it is evident that magazine 25 comprises a box-like enclosure having a top 260, a bottom 261 and sides 262 and 263. The enclosure may be made of resin molded as upper and lower halves. The rear end of the enclosure has a swinging door 264 which is for inserting a stack of unexposed films into it. The hinge 265 of door 264 comprises a web of plastic or resin material which is integrally molded with bottom 261 and door 264. Web 265 is flexible enough to permit door 264 to swing. The magazine also has a front or film exit door 36 which has a corresponding reference numeral in FIG. 2. Door 36 has an integrally molded web 266 which hinges it to magazine top 260. In FIG. 16, the door in its open position is shown in phantom lines and marked 36'.

As can be seen in FIG. 19, a typical side wall 262 of the magazine enclosure has a joint 267 that results from molding the top 260 and bottom 261 as separate halves. The two halves may be pressed together and an adhesive may be used at their interface to create a light-tight enclosure. In one model the two halves are joined by ultrasonic welding. Some internal parts of the magazine are molded in the top and bottom halves and other parts are assembled before the halves are pressed together to form a light-tight enclosure.

Top 260 of the feed magazine has a sliding door 268 installed in it. The door is aligned with an opening 269. A lug 270 extends upwardly from the door. This lug is engaged by dog 33 in FIG. 2 when magazine 25 is inserted in the spot film device. Insertion of the magazine thereby results in door 268 sliding open to provide access to film within magazine 25 through opening 269. Door 268 is slidable on side tracks 271. A pair of links 275 and 276 are coupled with door 268 for opening and closing it. These links are similarly shaped. Link 275, for example, has a slot 277 which engages a pin 278 on the door. Slot 277 allows for distance compensation when link 275 swings on its pivot axis 279. When link 275 is in its solid line position as in FIG. 12, top door 268 is closed. When the link swings to its phantom line position 275', door 268 is open to provide access by film feed roller 34, see FIG. 2, to the top sheet of a stack of films in the magazine 25.

Sliding door 268 is biased toward closed position by a spring 281 which is connected to a stationary pin 282 at one end and has its other end engaged with a pin 283 that is carried by the end of link 275. When sliding door 268 is urged rearwardly as a result of its lug 270 encountering dog 33, spring 281 is stretched or loaded so that it will begin closing the door as magazine 25 is retracted from the spot film device shown in FIG. 2.

The mechanism affiliated with door link 276, which is a counterpart to link 275 in FIG. 12, is similar to that just described although the associated spring mechanism is not visible in that figure.

Sliding door 268 on top of the feed magazine is coupled to the front or film exit door 36 so that door 36 opens and closes in correspondence with door 268. For this purpose a rod-like link 285 connects door 36 to pin 283 which is on the end of sliding door link 275. The end of link 285 makes a right angle bend where it enters a hole 286 in a pad 287 that is fastened to the interior of film exit door 36. This amounts to a hinge connection which allows door 36 to swing when link 285 which couples the top and end door is translated endwise.

The bottom interior of feed magazine 25 has a planar surface which is the top surface of a metal plate 288. The plate has depending side portions such as 289–291 which are bent laterally further to form integral bases 292–294. The bases are fastened to the bottom of the magazine by resin projections such as 295 which are similar to rivets and are flared by heating or other. The rear end of bottom plate 288 is bent downwardly as indicated by the numeral 295. The front edge 296 of plate 288 terminates adjacent a laterally extending recess 297 which is formed in the bottom 261 of magazine 25.

When looking from the front to the rear of the magazine as in FIG. 19, one can see a film side guide 298 extending downwardly. This guide may be molded into top 260. There is a corresponding side guide on the other side of the magazine. The two side guides together with smooth bottom 288 define a space 299 for accommodating a stack of films in the magazine. Guide 298 and its counterpart are closely adjacent to the side edges of the film stack when there is film in the magazine. The guides maintain the film in alignment and prevent it from becoming enmeshed in the door operating mechanism including the spring 281 and door opening link 285 which are in the space 300 as viewed in FIG. 19 although the parts are omitted from that figure.

The magazine 25 is provided with a film retainer which is shown schematically in FIG. 16 and generally designated by the reference numeral 301. The retainer is shown in greater detail in FIG. 15. The retainer comprises two leaf spring or flat spring elements 302 and 303 which extend about half the length of the magazine and are disposed on opposite sides thereof. A typical flat spring 302 as seen in FIG. 15, has a pair of holes 304 and 305 which enable fastening the spring to the bottom of the magazine with a pair of screws 306 and 307 which are evident in FIG. 16. As shown in FIG. 15, the flat springs 302 and 303 are bridged by a retainer member 308. The retainer member 308 has a depending lip 309 which normally extends into recess 297 in the bottom of the magazine as can be seen in FIG. 16. The tendency for flat springs 302 and 303 is to lay flat against the bottom of the magazine.

Retainer member 308 has a pair of extensions 310 and 311 which extend rearwardly and overhang the forward margin or edges of a stack of films 312 which are loaded into the magazine through rear door 264. Thus, the leading or forward edges of the films in the stack are retained by depending portion 309 and the two overhanging portions 310 and 311. This arrangement prevents the top sheet of film stack 312 and all of the underlying sheets from leaving the magazine inadvertently. The rear edges 313 and 314 of extensions 310 and 311 are preferably beveled. The space between the inner edges of springs 302 and 303 is somewhat greater than the width of the film 312.

One may see in FIG. 15, that the top film sheet in the stack 312 may be caused to advance to the left, as shown, past retainer 308 by moving the top sheet of film rearwardly or to the right so that its leading edge is withdrawn from under extensions 310 and 311. Then the single sheet of film may be urged forwardly past the retainer and out of the opening for door 36.

In FIGS. 14 and 16 one may see one of a similar pair of laterally separated rear film stops 315. Each stop 315 has an angulated surface 316 and it is mounted for pivoting on a pin 317. In this embodiment, when rear door 264 is opened, stops 315 may be swung on pins 371 along the arc indicated by the broken line 318. When swung out of the way, there is clearance for inserting a stack of film through the rear door.

In FIG. 14, the back edge of a film stack is marked 319 and the side edge is marked 320. One may see that the corner of the film 321 is rounded and is in tangential contact with angled surface 316 of the stop 315. Stop 315 is held in its unpivoted FIG. 14 position by closure of door 264. Note that there is a free space 322 between the rear edge 319 of the film and the door 264. This free space extends substantially across the width of the magazine, at least to the counterpart of stop 315 at the opposite side of the magazine. The side edge 320 of the film in FIG. 14 is maintained in position by side guide 298 shown in FIG. 19. Thus, the side edges of the film in a stack are between side guide 298 and its counterpart on the opposite side of the magazine which is not shown.

In connection with FIG. 15 it was explained that the top sheet of film 312 may be urged by feed roller 34 in a rearwardly direction so as to withdraw the leading edge of the top most film from under overhanging portions 310 and 311 of film retainer 308. This rearward movement of the film is effected by counterclockwise rotation of feed roller 34 in FIG. 2. The topmost film is thereby driven against angle surfaces 316 of the stops 315 so that the rearward or trailing edge 319 of the film is forced back into free space 322 at the rear of the magazine. This causes the rear end of the single film to assume a curved cross section and permits the film to withdraw from under overhanging portions 310 and 311 of the retainer. When the leading edge of the film is withdrawn from the retainer by rotation of feed roller 34 in one direction, the roller is automatically reversed and the single film is propelled outwardly of feed magazine 25 through door 36 whereupon it is engaged by driven rollers 72 and 73, see FIG. 2, which project the film into the movable cassette 40.

In FIG. 14, it is evident that rear door 264 is provided with a latch bolt 325 and a manually engagable bolt slider 326. Bolt 325 is biased toward latching engagement with the magazine sides with a spring 327. Any suitable rear door construction may be used. The main purpose of the door is to permit inserting a stack of unexposed films in the magazine while it is in a dark room preferably. The door must be capable of closing in a light-tight fashion in respect to the magazine.

In FIG. 16 it is evident that the top sliding door operating mechanism is prevented from abrading the film by a guard strip 329 which is suitably bowed to allow room for the sliding door operating linkage.

Loading feed magazine 25 with a stack of films will now be described. FIG. 16 shows that the bottom 261 of magazine 25 is provided with a socket 330 in which there is a ball 331 which serves as a plunger. There is an access bore 332 to socket 330 which defines shoulders on which the ball rests. The ball may be made of steel. Ball 331 is held in socket 330 directly under flat spring 302 for the film retainer 301. There is another ball plunger and socket arrangement underneath flat film retainer spring 303. The purpose of the balls is to facilitate loading a stack of film into the feed magazine 25. This is done by placing the magazine 25 on a jig or flat plate, not shown, on which there are two upstanding pins, not shown, that pass into access holes 332 and press the balls upwardly. This causes the spring retainer 301 to assume its upwardly deflected position as indicated by the phantom lines in FIG. 16. Then, with rear door 264 open, a stack of film may be inserted into the magazine between side guides 298 until the leading edge of the film is stopped by the downwardly depending portion 309 of cross member 308 on the film retainer assembly. The rear door 264 of the magazine is then closed and the magazine is lifted from the pins so that the heavy metal balls 331 may drop down to the socket shoulders 331 at which time the spring force in flat springs 302 and 303 causes the retainer 301 to press down on the film and hold it securely in the magazine. With the front door 36 and the rear door 264 closed, the feed magazine may be transported through a lighted room for insertion in the spot film device at an angular position such as shown in FIG. 2. When inserted, the top sliding door 268 of the magazine is forced open and front door 36 also opens due to interconnection of the doors. Upon command, rocking frame 49 in FIG. 2 may then be rocked so as to place feed roller 34 in contact with the topmost film in the stack while the roller is operating to frictionally engage the topmost film and move it slightly rearwardly against the stops 315 as explained. The roller is then automatically reversed and the film is propelled out of door 36 to the spot film cassette 40.

The feed cassette 25 is provided with means for indicating when the supply of film therein is exhausted. In FIG. 12 a part of the magazine enclosure is broken away to show a plan view of the film indicator. FIG. 13 shows it in fragmentary section. The film indicator comprises a lever 336 which is carried on a pivot pin 337. The lever has a right angularly bent portion 338 which is struck by the film stack when it is inserted such as to cause lever 336 to rotate from its solid line position in FIG. 12 to the position in which it is depicted in phantom lines in the same figure. In the latter position, the extension 338 assumes a position of parallelism with the edge of the film stack. A spring 339 tends to force the lever into interfering relation with the film.

In FIG. 13 one may see that the magazine is provided with a window 340 which transmits red or infrared radiation. Immediately outside of the window is a infrared source 341 which is surrounded by a radiation sensitive element 342. The flat portion of lever 336 has black and white adjacent areas on its surface. When there is at least one film present in the magazine, lever 336 is so positioned that its white surface receives light from the source and reflects it back to the sensor 342. By suitable electric circuitry, not shown, this sensed signal is processed and serves as an indication of the presence of film. When the last sheet of film is withdrawn from the magazine, lever 336 assumes its solid line position as shown in FIG. 12 and its black surface is presented toward the light source and sensor 341 and 342, respectively. The sensor 342 then senses no reflected radiation and effectuates operation of an indicator lamp, not shown, which reveals that the supply of film in the magazine is exhausted.

The bottom 261 of feed cassette 25 also has a laterally extending shallow recess 345 which is for securing the magazine in place in the spot film device by coaction with latch 245 which appears in FIG. 2. This latch cooperates with feed magazine 25 in substantially the same manner in which latch 241 cooperates with film receiving magazine 35 as was explained earlier.

A unique characteristic of the feed magazine 25 just described is that it assures only one sheet of film will be withdrawn therefrom and projected into cassette 40.

Although an embodiment of the new automatically loading and unloading spot film device and cooperating feed magazine have been described in considerable detail, such description is intended to be illustrative rather than limiting, for the invention may be variously embodied and is to be limited only interpretation of the claims which follow.

We claim:

1. For use with diagnostic x-ray apparatus including an x-ray source and means for supporting an examination subject in the path of an x-ray beam therefrom, a spot film device for recording x-ray images produced with said apparatus, said device comprising:
   a. enclosure means having an x-ray permeable portion for extending into said beam path,
   b. cassette means movable in said enclosure means between a first radiographic position in said beam path and a second position,
   c. means in said enclosure means adjacent said second position for holding a film feed magazine in a position for presenting film to said cassette means and means for holding an exposed film receiving magazine in a position for receiving film from said cassette means,
   d. means for withdrawing a film from a feed magazine that is in said holding means and for transporting said film to said cassette means when it is in its second position,
   e. means for selectively ejecting a film from said cassette means to a receiving magazine that is in said holding means in response to said cassette means moving from its first position toward its second position, and
   f. means for moving said cassette means selectively back and forth between its first and second positions.

2. The spot film device defined in claim 1 wherein:
   a. said cassette means comprises platen means and cover means, said cover means being openable in respect to said platen means,
   b. said ejecting means being operable to eject said film when said cover means is open.

3. The spot film device defined in claim 1 wherein:
   a. said film cassette means comprises platen means and cover means, said cover means being swingable with respect to said platen means about an axis that is transverse to the direction of movement of said movable cassette means when moving between positions, said axis being near the leading end of said cassette means when moving toward said first position.

4. The device defined in claim 1 wherein:
   a. said cassette means comprises platen means and cover means, said cover means being openable from said platen means, and
   b. cover opening means that are selectively operable to open said cover means when said movable means is at a predetermined position relative to said second position of said cassette means.

5. The device defined in claim 2 including:
   a. cover means opening means interposed between said first and second cassette means positions, said opening means having two selectable states in one of which said cover means is engaged and opened in transit between said first and second positions and in the other of which said cover means is not engaged,
   b. said film ejecting means comprising spring means and means for storing energy in said spring means and for releasing said spring means for applying a force to said film to eject it from said film cassette means into a receiving magazine when said cassette means is proximate thereto.

6. The device defined in claim 1 wherein:
   a. said cassette means comprises platen means, cover means and means for biasing said cover means toward said platen means,
   b. a pair of spaced apart pivotable elements on said cassette means and flat spring means fastened to and extending between said elements, said spring means being deflectable from one side to the other side of a line connecting the pivot axes of said elements,
   c. means selectively operable to engage said elements for deflecting said spring means from said one side to said other side whereupon said spring means may impact said film and eject the same from said film cassette means while it is in transit to said second position, and
   d. means for resetting said spring means from said other to said one side of said line in response to said cassette means reaching a predetermined location in transit to its second position.

7. The device defined in claim 6 wherein:
   a. said cover means is pivotable with respect to said platen means on an axis that is transverse to the line of movement of said movable cassette means,
   b. said film being positionable between said cover means and said platen means with an edge of said film proximate to said axis for enabling said spring means to strike said film and eject it from said cassette means when said cover is open.

8. The device defined in claim 4 wherein:
   a. said cover opening means comprises ramp means interposed in the path of said movable cassette means, said ramp means being operable between two states in one of which said cover means may pass said ramp means without being opened when in transit from said second position and another state in which said cover means is engaged by said ramp means and opened during said transit, and
   b. means for selectively operating said ramp means.

9. The device defined in claim 8 wherein:
   a. said cover means is hinged with respect to said platen means,
   b. said film ejecting means comprising over-center flat spring means carried on said movable cassette means,
   c. means operable to engage said spring means when said movable cassette means is nearing said second position to thereby deflect said spring means from one side of center to the other side of center,
   d. means selectively operable to engage said spring means while said movable cassette means is in transit from said first position toward said second position, said spring engaging means causing said spring means to return to said one side of center.

10. The device defined in claim 2 including:
    a. hinge means on which said cover means is swingable with respect to said platen means to provide an opening presented toward said receiving magazine holding means,
    b. means for permitting an edge of a film to extend from under said cover means in the vicinity of said hinge means,
    c. said film ejecting means including spring means and means operative in response to movement of said movable cassette means toward its second position to load said spring means and means operative prior to said cassette means reaching its reloading position to release said spring means for striking said film edge to thereby eject said film from said film cassette means toward said receiving magazine holding means, and
    d. means which are selectively operable to swing said cover means open to permit ejection of said film.

11. The device defined in claim 10 wherein:
    a. said spring means comprises a flat spring member pivotally supported at its opposite ends adjacent said film edge, said spring means having means extending therefrom beyond said pivotal supports, respectively, and
    b. means in the path of said spring means for resetting said spring means.

12. A radiographic spot film device in which film is automatically loaded and unloaded, comprising:
    a. cassette means movable generally in a first plane between a first active radiographic position in the path of an x-ray beam and a second parking and film loading position,
    b. housing means enclosing said movable cassette means at least coextensive with its path of travel,
    c. said housing means including film magazine entry openings and means for accommodating a film feed magazine and an exposed film receiving magazine in the vicinity of said second position,
    d. means in said housing means for opening first and second door means on a feed magazine inserted into said housing,
    e. means in said housing means for opening a door in a film receiving magazine inserted into said housing,
    f. film transport means including a support and film feed roller means journaled for rotation thereon,
    g. means for selectively moving said support means to effect frictional engagement between said roller means and a film in a feed magazine which film is presented when said second door means of a feed magazine is opened, and
    h. film feed motor means drivingly coupled with said feed roller means and selectively operable to rotate said roller means and thereby expel a film from a feed magazine to said film cassette means when the latter is in its said second position.

13. The device defined in claim 12 including:
 a. means selectively operable to eject exposed film from said cassette means when it is proximate to said second position,
 b. cooperating roller means for receiving ejected exposed film therebetween, and
 c. driven means operatively coupled with at least one of said ejected film receiving roller means to cause said last named roller means to transport film into an exposed film receiving magazine.

14. The device defined in claim 12 wherein:
 a. said film feed roller means comprises unfaced neoprene rubber.

15. The device set forth in claim 12 including:
 a. sealing means surrounding said openings in said housing for engaging in light tight sealing relationship with film magazines inserted into said housing.

16. The device defined in claim 12 wherein:
 a. said film cassette means comprises platen means and cover means cooperating therewith, said platen and cover means being constructed and arranged for compressing a film between them,
 b. means selectively operable to open said cover means at least when said film holding means is at said second position, and
 c. means for guiding a film from said film feed roller means into said film cassette means.

17. The device defined in claim 12 wherein:
 a. said film feed magazine and said film receiving magazine holding means each comprise guide means for holding said magazines at an angle relative to said plane of movement of said movable means.

18. The device defined in claim 17 wherein:
 a. said film feed magazine holding means is located for holding said feed magazine above said film receiving magazine holding means in respect to the movement plane of said movable means when said plane is nominally horizontal.

19. The device defined in claim 17 including:
 a. curved film guide means adjacent said feed magazine means, said curved film guide means being effective to change the attitude of a film from said angle with respect to said plane of movement to coincidence with said plane to enable film to enter said film cassette means.

20. The device defined in claim 12 including:
 a. means for applying identification marking to said film, said marking means being located adjacent the path to be followed by the film between a magazine and said film cassette means.

21. The device defined in claim 12 including:
 a. idler roller means and second film feed roller means cooperating therewith to engage therebetween a film that is expelled by said first named feed roller means, said second roller means being drivingly coupled with said motor means and being journaled on said support means, and
 b. means for controlling said motor means to control said film feed roller means to first move said film in said feed magazine in a direction away from the film exit door opening of said feed magazine and secondly toward said opening and out of said feed magazine to said second roller means.

22. A spot film device, comprising:
 a. housing means,
 b. cassette means mounted for bidirectional movement in said housing means between a first radiographic station and a second parking and film transfer station, said cassette means including platen means and means for compressing a film thereagainst,
 c. an unexposed film feed magazine insertable in said housing in proximity with said second station, said feed magazine having door means,
 d. means for opening said door means of a film feed magazine when said magazine is inserted in said housing means,
 e. film feed means in said housing including power driven first friction roller means and selectively operable means for moving said roller means into frictional engagement with a film through a said door means when it is open and for advancing a film through another of said door means,
 f. second power driven film advance roller means for engaging a film which has been advanced outwardly of said feed magazine by said first roller means, said second roller means being operative to transport said film to said cassette means when said cassette is at said second station,
 g. means selectively operable to relieve said film compressing means from said platen means of said cassette means in response to movement thereof toward said second station to thereby permit said film to be inserted between said compressing and platen means, and
 h. means for restoring said compressing means to compressive relation with said platen means at least when said cassette means is in said first radiographic station.

23. The device defined in claim 22 including:
 a. a movable support on which said first and second roller means are journaled, said support being movable between a first position wherein said first friction roller means is disengaged from said film and a second position wherein said frictional film engagement is effected, said support being constructed and arranged for said first friction roller means to be released from said film when said second roller means has engaged said film, and
 b. means for actuating said support sequentially from its first position to its second film engaging position and back to its first position.

24. The device defined in claim 23 wherein:
 a. said movable support is pivotally mounted and said roller means are spaced from each other on parallel axes of rotation.
 b. said actuating means including means biasing said support means to its first position and electrically operable means for pivoting said support means in opposition to said biasing means.

25. The device defined in claim 24 wherein:
 a. said electrically operable means is a solenoid means operatively connected with said support means.

26. The device defined in claim 23 wherein:
 a. said support means is mounted for pivoting about an axis parallel with the axes of said roller means,
 b. a belt and pulley system means operatively coupling said roller means for joint rotation,
 c. motor means and means operatively coupling said motor means to said belt and pulley system means for driving said system when said support is in either of its positions.

27. The device defined in claim 23 including:
a. a belt and pulley system operatively coupling said roller means for joint rotation,
b. motor means and means operatively coupling said motor means to said system for driving the same when said support is in either of its positions.

28. The device defined in claim 26 wherein:
a. said second feed roller means includes a driven roller and an idler roller for engaging and transporting film advanced from said supply magazine,
b. said driven and idler rollers contacting each other tangentially at such point that a film between them is directed in a predetermined path toward said cassette means.

29. The device defined in claim 22 including:
a. reversible motor means for driving said roller means, said motor means being operable in one direction for a short interval when said first roller means is initially contacted to said film to move said film a short distance in a direction opposite the direction of film ejection from said feed magazine and said motor means being operable in another direction sequentially to drive said first roller means reversely for moving said film in the direction for ejection from said feed magazine.

30. The invention defined in claim 22 wherein:
a. at least said first friction roller means comprises elastomeric material selected from the class consisting of a diprene and neoprene rubber.

31. The invention defined in claim 22 wherein:
a. at least said first friction roller is comprised of unfaced neoprene rubber.

32. The device defined in claim 22 wherein:
a. said film supply magazine comprises a box-like structure having a top, a bottom, sides and ends,
b. the first one of said doors for permitting said film feed roller to engage said film being in other than the sides and ends of said structure,
c. the second one of said doors being hingedly mounted at an end of said structure for discharging film therefrom.

33. The device defined in claim 32 including:
a. means mechanically interconnecting said first door to said second door for corresponding joint operation,
b. said door opening means comprising latch means in said housing, said latch means being actuated by insertion of said feed magazine to engage said first one of said doors and open the same while thereby simultaneously opening the second one of said doors for removal of film therefrom, and
c. means operative to bias said doors closed when said first door is unlatched by withdrawing said feed magazine from said housing.

34. The device defined in claim 33 including:
a. means in said feed magazine supporting said one first door for sliding movement in substantial parallelism with the top of said magazine.

35. The device defined in claim 22 including:
a. guide means in said housing means for receiving said film feed magazine, said housing means having an opening for insertion of said magazine in light sealed relationship with respect to said housing means, said guide means supporting said feed magazine in a plane which intersects the movement plane of said cassette means at an acute angle,
b. the first one of said doors in said film feed magazine being mounted for sliding in respect to an opening in said magazine to provide access for said first friction roller means,
c. a second one of said doors being hinged to close and end of said feed magazine from which film is expelled by said roller means, said second door being at the lower end of said magazine when the latter is inserted in said guide means.

36. The device defined in claim 22 including:
a. latch means in said housing means actuable by insertion of said film feed magazine to a predetermined position to engage said magazine and prevent its withdrawal from said housing, and
b. means for releasing said latch means to permit withdrawal of said magazine.

37. The device defined in claim 22 wherein:
a. said film feed magazine comprises a box-like structure having a top, a bottom, sides and ends,
b. a latch member biased into the path of said magazine and pivotable in response to insertion of said magazine to engage said magazine and prevent withdrawal thereof, and
c. latch release means for urging said latch member to pivot further to disengage said magazine and permit its withdrawal.

38. The device defined in claim 37 wherein:
a. said latch release means includes a pinion connected to said latch member and having the rotational axis thereof coincident with the pivot axis of said member, and
b. a biased and guided gear rack outside of said housing means and engaged with said pinion, whereby pressing on said gear rack will rotate said pinion and latch member to permit release of said magazine.

39. The device defined in claim 22 including:
a. means for discharging film from said movable cassette means,
b. a film receiving magazine at said second station for receiving said discharged film within said housing means,
c. said receiving magazine having at least one door swingable inwardly thereof to provide an entrance for film,
d. guide means for supporting said receiving magazine in said housing, and
e. means in said housing for actuating said one door to open in response to insertion of said receiving magazine.

40. The device defined in claim 39 including:
a. driven film removal third roller means outside of said receiving magazine door, said removal roller means transferring a film discharged from said cassette means into said receiving magazine.

41. The device defined in claim 39 wherein:
a. said means for actuating said door to open comprises a projecting means which abuts said door when said receiving magazine is inserted a predetermined distance into said housing,
b. said projecting means being positioned relative to said swinging door so that the latter swings to an acute angle in relation to a transverse plane through said magazine and serves as a guide for directing discharged film into said magazine.

42. The device defined in claim 39 wherein:
a. said receiving magazine is supported by said guide means in a plane which intersects the plane of movement of said cassette means at an acute angle.

43. The device defined in claim 42 wherein:

a. said receiving magazine and said supply magazine guide means support said magazine means in substantial parallelism with each other.

* * * * *